United States Patent [19]
Cedervall et al.

[11] Patent Number: 6,134,228
[45] Date of Patent: Oct. 17, 2000

[54] METHOD AND SYSTEM FOR DETERMINING THE POSITION OF A MOBILE TERMINAL IN A CDMA MOBILE COMMUNICATIONS SYSTEM

[75] Inventors: Mats Cedervall, Vallentuna, Sweden; Karim Jamal, Tokyo, Japan

[73] Assignee: Telefonaktiebolaget LM Ericsson (publ), Stockholm, Sweden

[21] Appl. No.: 08/989,491

[22] Filed: Dec. 12, 1997

[51] Int. Cl.[7] .................................................. H04B 7/216
[52] U.S. Cl. ............................................. 370/335; 375/147
[58] Field of Search ................................... 370/252, 335, 370/342, 331, 332, 333, 334; 375/200, 206, 147, 141, 143; 455/456, 457; 342/450, 457, 458

[56] References Cited

U.S. PATENT DOCUMENTS

| | | | |
|---|---|---|---|
| 5,508,708 | 4/1996 | Ghosh et al. | 342/457 |
| 5,596,330 | 1/1997 | Yokev et al. | 342/387 |
| 5,646,632 | 7/1997 | Khan et al. | 342/375 |
| 5,675,344 | 10/1997 | Tong et al. | 342/457 |
| 5,736,964 | 4/1998 | Ghosh et al. | 342/457 |
| 5,790,537 | 8/1998 | Yoon et al. | 370/342 |

FOREIGN PATENT DOCUMENTS

| | | |
|---|---|---|
| 0 800 319 A1 | 10/1997 | European Pat. Off. . |
| 100447 | 9/1998 | European Pat. Off. . |
| WO 96/25673 | 8/1996 | WIPO . |

*Primary Examiner*—Valencia Martin-Wallace
*Assistant Examiner*—Kim T. Nguyen
*Attorney, Agent, or Firm*—Jenkens & Gilchrist, P.C.

[57] ABSTRACT

A method and system for use in determining the position of a mobile terminal in a CDMA mobile communications system is disclosed, whereby a different than usual spreading code is used when TOA measurements are being performed, but information is allowed to be transmitted while those TOA measurements are being performed. In one embodiment, the length of the different spreading codes used is equal to one symbol length. In a second embodiment, a mobile terminal uses a long spreading code and short spreading code prior to making TOA measurements. When TOA measurements are to be made, the serving base station orders the mobile terminal to change the spreading code by terminating the use of the long code and continuing use of the short code. Alternatively, when the TOA measurements are to be made, the serving base station orders the mobile terminal to substitute a second, predetermined short code for the long code being used, and to continue use of the first short code. The TOA measurements are then performed in at least three base stations, and the position of the mobile terminal is derived from this TOA information. The serving base station then orders the mobile terminal to resume normal operations using the long code.

23 Claims, 5 Drawing Sheets

METHOD AND SYSTEM FOR DETERMINING THE POSITION OF A MOBILE TERMINAL IN A CDMA MOBILE COMMUNICATIONS SYSTEM

BACKGROUND OF THE INVENTION

1. Technical Field of the Invention

The present invention relates in general to the to mobile radio communications field and, in particular, to a method and system for use in determining the geographical position of a mobile radio terminal ("geolocation") in a mobile radio system following a Code Division Multiple Access (CDMA) standard.

2. Description of Related Art

Commonly-assigned U.S. patent applications Ser. Nos. (Attorney docket Nos. 27946-00353 and 27946-00354) filed on Nov. 26, 1997 disclose methods for use in performing position determinations in a Time Division Multiple Access (TDMA) system. The methods include the steps of ordering an intra-cell handoff, receiving in three radio base stations (BSs) repeated access bursts from a mobile radio terminal (mobile station or MS) whose position is to be determined, in each RS incoherently integrating the squared absolute values of those bursts, and determining the uplink time-of-arrival (TOA) by statistically evaluating the TOA results from randomly selected groups of these bursts. The uplink TOA information is used to derive the position of the MS.

The IS-95 standard (CDMA) published by the Electronics Industry Association/Telecommunications Industry Association (EIA/TIA) discloses the use of a spreading code for TOA measurements in conjunction with determining the position of a MS. The spreading code used is a long code (LC) with a periodicity of thousands of chips, but it is designed for other uses than position determination. As such, the information superimposed on this LC must be known when using it for position determination purposes.

A drawback of the first-mentioned position determination method using TOA information is that it is not suitable for use in CDMA systems, because received information in CDMA systems is superimposed on the spreading codes. A drawback of the second-mentioned method is that it is not optimized for use in making position determinations. As such, since determining the position of mobile terminals has become very important in the mobile communications field, it is just as important to have a method that is optimized for this particular purpose.

SUMMARY OF THE INVENTION

One problem with CDMA systems that the present invention addresses is how to design a spreading code for TOA measurements so that it is not necessary to know the information that is being spread and transmitted.

Another problem addressed by the present invention is how to decrease the disturbance-generating cross-correlation between the MS whose position is to be determined, and the uplink signals from other MSs not involved in the position determination process.

Still another problem addressed by the present invention is how to preserve subscriber privacy, by enabling the MS to inhibit/approve its position determination when operating in the conversation mode.

It is, therefore, an object of the present invention to provide a method and system for determining the position of a MS in a CDMA system, wherein a spreading code is used for determining the TOA of the received spread signal, without needing to know the information superimposed on the transmitted spread signal.

It is another object of the present invention to provide a method and system that makes it simpler to design a correlation algorithm for determining the position of a MS.

It is still another object of the present invention to provide a method and system that makes it technically necessary for an operator to receive approval from a subscriber before determining the position of that subscriber's MS.

The foregoing and other objects of the present invention are attained by using a different than normal spreading code when TOA measurements are being performed, but still allowing information to be transmitted while those TOA measurements are being performed.

In one exemplary embodiment of the present invention, the length of the different spreading code used while the TOA measurements are being performed is equal to one symbol length. This symbol length can comprise 256 chips, the symbol can be 64 μsec long, and correspond to the length of one (superimposed) information bit.

In a second exemplary embodiment of the present invention, a MS uses a long spreading code (LC) and short spreading code (SC) prior to making TOA measurements. When TOA measurements are to be made, the serving BS orders the MS to change the spreading code by terminating the use of the LC and continuing use of the SC. The TOA measurements are then performed in at least three BSs for up to many thousands of received symbols. The position of the MS is derived from this TOA information, and the serving BS orders the MS to resume normal operations using the LC.

In a third exemplary embodiment of the present invention, the MS uses an LC and SC prior to making TOA measurements. When TOA measurements are to be made, the serving BS orders the MS to substitute a second, predetermined SC for the LC being used, and to continue use of the first SC. The TOA measurements are then performed in at least three BSs for many (from one hundred up to many thousands) received symbols. The position of the MS is derived from this TOA information, and the serving BS orders the MS to resume normal operations using the LC.

In a fourth exemplary embodiment of the present invention, the MS obeys an order from the serving BS to use an SC only if the MS's subscriber agrees to allow the MS's position to be determined. This agreement by the subscriber can be conveyed to the MS by a permission message entered via the keypad of the MS.

An important technical advantage of the present invention is that it provides TOA measurements for CDMA systems (preferably for the uplink) that can be used to determine the position of a MS, without needing to know the transmitted information.

Another important technical advantage of the present invention is that the use of a decreased code length for TOA measurements simplifies the algorithms used for position determination.

Still another important technical advantage of the present invention is that subscriber privacy is built into the system, which impedes operators from determining the position of a MS without agreement from that MS's subscriber.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–5 of the drawings, like numerals being used for like and corresponding parts of the various drawings.

Essentially, in most operational and planned cellular CDMA systems, under normal operating conditions and/or existing protocols, each symbol to be transmitted by the MS is first spread by a SC. The time length of the SC is typically equal to the symbol period. The resulting signal is then scrambled by at least one LC. The time-length of the LC is typically significantly longer than the symbol period, and in fact, can be several weeks or months long. The spread signal is then modulated and transmitted over the air interface. At the receiver (in the present uplink case, a BS), the received signal is correlated with the known LC and SC, and the original data is reconstructed.

In accordance with a preferred embodiment of the present invention, the MS whose position is to be determined is ordered to use a shorter scrambling code (SSC) than the LC ordinarily used for scrambling. This SSC preferably has a time-length of one symbol period. on accordance with an alternate embodiment, the MS can be ordered not to use any scrambling code (LC or SSC) at all, which is less advantageous than the preferred embodiment. However, if no scrambling code is to be used, the MS can be ordered to substitute a different SC for the SC used in normal operations, which makes the MS identifiable by a non-active BS (i.e., those BSs that the MS whose position is to be determined is not connected to), such as a target BS.

By using the SSC (or different SC), the non-active BSs can readily find the timing of the MS's signal using a matched filter which is matched to the SC+SSC (or only to the SC if the scrambling code is omitted). Also, non-coherent detection is used, along with combining over a relatively long period of time (as described in more detail below). Notably, in accordance with the present invention, the MS can transmit its normal traffic data, so that there is no information loss or loss of capacity due to a new, non-information-carrying signal being transmitted. Consequently, in contrast with conventional systems, there is no need to radically increase the MS's transmit power, which would have caused increased interference and, thus, a loss in capacity and possibly, radio frequency (RF) blocking of the active BS. An important advantage of the present use of short codes is that it becomes much easier for the non-active BSs to correlate to the MS signal. Preferably, a matched filter with a length equal to the length of the code is used. Alternatively, sliding correlators can be used, but the search time is longer than that of the matched filter approach, because the sliding correlator correlates at one time-offset at a time.

As such, the timing thus obtained is unambiguous for up to one symbol interval. However, as described in more detail below in accordance with the present invention, the non-active BSs are not required to decode the data stream from the transmitted signal, the non-active BSs merely have to find the timing of the signal. When the timing thus obtained is used for position determination purposes, the timing ambiguity can cause an ambiguity with respect to distance. For example, if the chip time is 0.24 $\mu$sec, and the length of the SC is 256 chips, the timing ambiguity will correspond to a distance ambiguity of:

$$(0.24~\mu s) \times (256) \times (3 \times 10^8) \text{m/s} = 18.4 \text{ km.} \qquad (1)$$

As such, this ambiguity could be a problem for relatively large cells, but this problem can be resolved with additional power measurements and sector information. In fact, the position of the MS can still be determined with a sufficiently good accuracy using power measurements alone to readily resolve such an ambiguity problem, if it exists.

Another potential problem that can arise is when the symbol length is allowed to vary. Consequently, the SSC can be longer than one data symbol (longer than the SC), which is problematic if the (SSC+SC) matched filter is used in non-active BSs. For example, this problem can occur when the spreading factor is variable. In other words, the spreading factor can be varied to allow for different data rates. If the slowest data rate is "B" symbols per second, and the corresponding SC has a length "N", the length of the SC will be $N \times 2^{-k}$ for a data rate equal to $B \times 2^k$. However, in accordance with the present invention, this ambiguity problem can be resolved using a number of methods, such as, for example: (1) ordering the MS to alter the data rate so that the length of the SC is "N"; (2) ordering the MS to use an SSC of length "N", without any rate alteration (the non-active BSs listen to a part of the MS signal that uses an SC of length "N", such as, for example, a physical control channel that can be transmitted along with a data-carrying physical data channel); and (3) ordering the MS to use an SSC with a length equal to $N \times 2^{-k}$ (equal to the length of the SC and the symbol length).

The first above-described method can be the preferable alternative for channels that have a rate closest to the slowest rate (e.g., speech), by using rate matching (e.g., code puncturing) and a power increase to make up for the lost coding gain. This method is quite convenient, because it is likely that a power increment approach will be used in any event to improve the "hearability" of the MS. The second above-described method can be used, for example, for systems that have a physical channel structure comprising a variable spreading factor, variable-rate physical data channel carrying information (physical data channel), and a parallel, fixed spreading factor, fixed rate, parallel channel carrying layer 1 control information (physical control channel). The physical control channel rate can be chosen to have a data rate of "B" symbols per second, and thus a corresponding SC of length "N". Non-active BSs can then "listen" to the physical control channel with a matched filter solution. The power of the physical control channel can be increased if needed to attain "hearability" in the non-active BSs. The third above-described method can be used as long as the SC length (symbol length) and, thus, also the SSC length, is long enough to keep the time-ambiguity manageable in the non-active BSs. This manageability is strongly related to the size and structure of the cell involved. However, apart from making additional power measurements, there are a number of other factors that can help with resolving the ambiguity problem, such as the following examples.

First, if the cell plan is sectorized, a relatively crude direction estimate can be obtained. Second, such a direction estimate can be refined by measuring the received MS power in several different sectors at the same site. The direction estimate can be obtained from the antenna angular response and direction, and if one or several of the BSs has an antenna array, the direction estimate obtained will be even better. Third, for active BSs, the round-trip signal delay can be estimated, and thus so can the distance(s) to the MS. Fourth, for BSs having a reasonably good C/I value, when symbol synchronization is achieved, it is possible to detect the data bits and thereby achieve slot and/or frame synchronization.

Fifth, the likelihood of choosing a correct location estimate can be improved by using a purely computational method. If a round-trip measurement can be obtained for at least one link, all of the TOAs obtained can be converted to round-trip measurements. Consequently, a set of possible radii can be drawn from each BS. Ideally, the corresponding circles intersect at one point, which can be assumed to be the MS's position. In general, considering the ambiguity problem, only the circles corresponding to the true radii should intersect at exactly one point, which should resolve the ambiguity problem. However, in practice, measurement errors occur, and even the circles with resolved ambiguities would not intersect exactly at the same point.

Consequently, in accordance with the present invention, a cost function is devised, which is a function of one radius from each BS and the MS's position. The minimum for this cost function with a set of fixed radii yields an estimated position of the MS. One of these minima can be obtained for each combination of radii. It is highly likely that the combination yielding the smallest minimum corresponds to the radii with resolved ambiguities. If the SSC is relatively short, there will be a relatively large number of combinations. However, the number of combinations can be reduced by first applying the afore-mentioned ambiguity resolving methods. As such, this fifth method can considerably reduce the effects of the ambiguities.

Finally, note that if the MS user is using a packet channel (i.e., not transmitting data all of the time), the cellular system needs to fix a channel on which the MS can transmit continuously during the position determination process, such as, for example, a physical control channel.

Figure 1A:
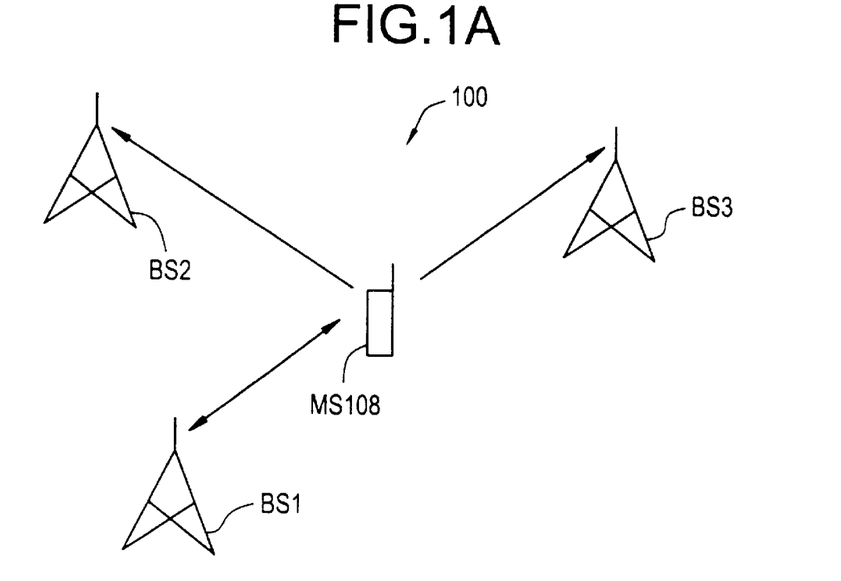
FIG. 1A is a schematic diagram of an exemplary cellular mobile radio system operating under a CDMA standard, in accordance with a preferred embodiment of the present invention.
Figure 1B:
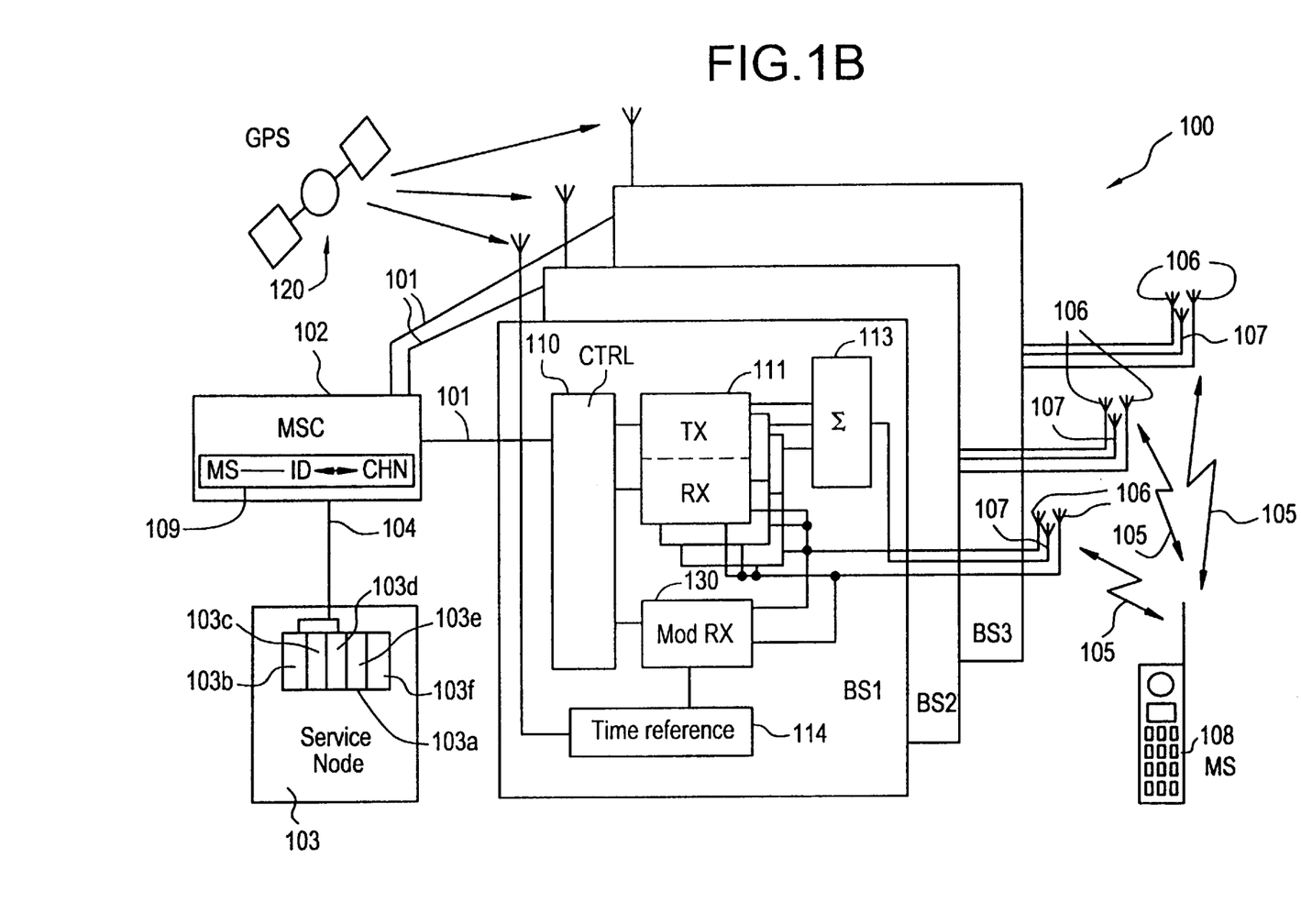
FIG. 1B is a schematic diagram that illustrates details of the cellular mobile radio system shown in FIG. 1A.

Specifically, FIG. 1A is a schematic diagram of an exemplary cellular mobile radio system 100 operating under a CDMA standard, in accordance with a preferred embodiment of the present invention. FIG. 1B is a schematic block diagram that shows the details of cellular mobile radio system 100 in FIG. 1A including an integrated position determination function, which can be used to implement the present invention. System 100 includes a plurality of radio BSs (an exemplary three are shown as BS1, BS2, BS3). The radio base stations are located at different sites and connected to a wire-bound network via communication links 101. The wire-bound network can include, for example, a mobile services switching center (MSC) 102 connected in turn via a Public Switched Telephone Network or PSTN (not explicitly shown) to a service node (SN) 103. The connection 104 preferably comprises trunk connections. The MSC 102 includes a look up table 109 for associating channel numbers (CHNs) with mobile terminal identities (MS-IDs).

The SN 103 includes a processor 103a, which further includes a receiving unit 103b, storing unit 103c, sending unit 103d, and respective first and second calculating units (103e, 103f). The first calculating unit 103e calculates the Time Difference of Arrival (TDOA) of the signals received on the uplink by the radio base stations, wherein the first calculating unit 103e uses reported TOAs. The second calculating unit 103f calculates the position of mobile radio terminals using the TDOA information and (optionally) any reported Direction of Arrival (DOA) information available. The storing unit 103c maintains the known geographical locations of the radio base stations. The receiving unit 103b and sending unit 103d provide two-way communications with customers that request/receive position determination information.

FIGS. 1A and 1B also show a mobile radio terminal MS 108 whose position is to be determined. The radio base stations BS1, BS2 and BS3 "listen" to the traffic channel of the MS 108 via uplink radio connections 105 received over the two receiving antennas 106 of each such BS. This two-antenna capability provides space diversity for the radio traffic and also for the position determination measurements being made in accordance with the present invention. Each radio base station (BS1, BS2, BS3) includes a control section 110, and a plurality of transmitter/receiver units (TXRXs) 111 connected to the receiving antennas 106. The transmitting antenna 107 is connected to the TX portion of the TXRX units via a summation module 113. Moreover, each such BS includes a time reference unit 114 that receives signals preferably from an accurate time reference, such as, for example, the space-based Global Positioning System (GPS) 120. The time reference signal is coupled continuously from the time reference unit 114 to the modified receiver (ModRX) module 130.

The BS of the present invention (e.g., BS1) includes a time reference unit 114 and control section 110, which is capable of serving more units in the BS than just the ModRX. Preferably, the ModRX 130 is located in a BS, but such a ModRX can also be a free-standing unit located remotely from the BS but connected to the control section 110 and time reference unit 114 of the BS. If a ModRX is located in a BS, the ModRx can share the BS's receiving antennas 106. However, if the ModRX is located remotely from the BS, the ModRX can include its own receiving antennas 106. It should be noted that if the ModRX is located in the same location as the BS, the ModRX does not need to have a separate receiver. In this case, the ModRX instead can comprise a program in base-band processing.

For this preferred embodiment, the position of the MS 108 is being determined by an uplink method utilizing short (scrambling and/or spreading) codes. However, the present invention is not intended to be limited to an uplink method, and can also be applied to a downlink mobile positioning method, or a combined uplink and downlink mobile positioning method.

Figure 2:
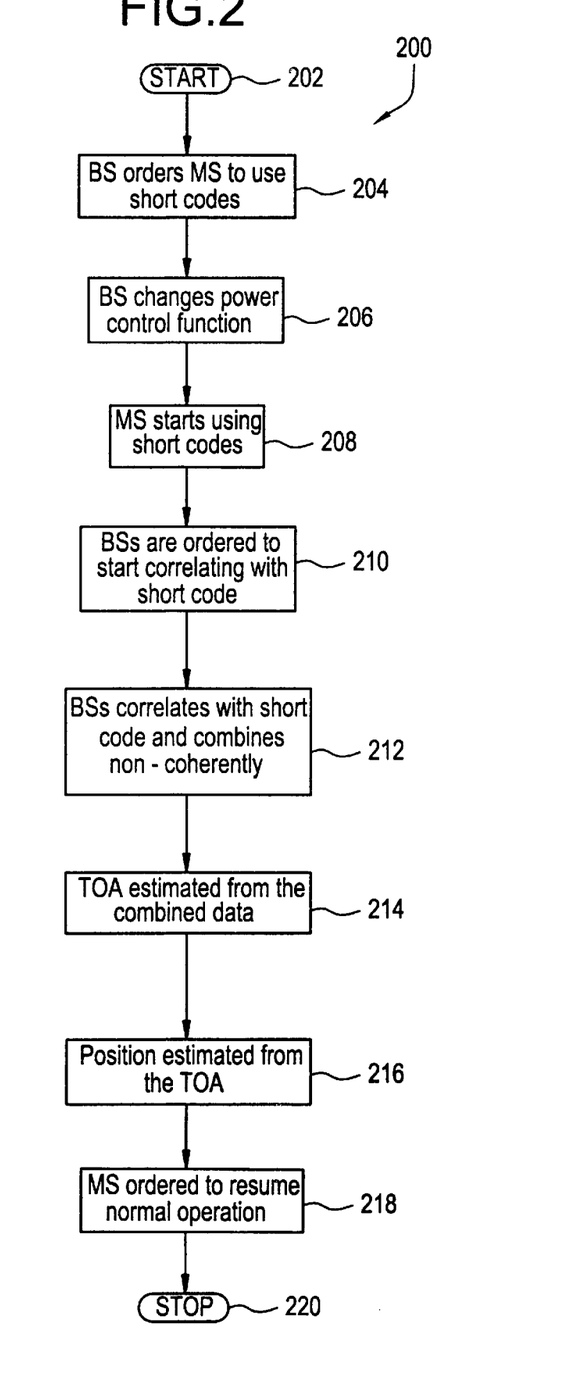
FIG. 2 is a flow diagram for an exemplary algorithm or method that can be used to determine the uplink TOA of a signal transmitted by a mobile terminal whose position is being determined, in accordance with the present invention.

FIG. 2 is a flow diagram for an exemplary algorithm or method 200 that can be used to determine the uplink TOA of a signal transmitted by MS 108 in FIGS. 1A and 12 whose position is being determined, in accordance with the present invention. Referring to FIGS. 1A, 1B and 2, at step 204, the positioning algorithm commences by an order from the serving BS (e.g., BS1) to the MS 108 to use short codes only (e.g., as described above, this can mean either switching the LC to an SSC, omitting the LC, or changing the SC to a different SC). At step 206, if deemed necessary, the MS 108 is ordered to increase the transmit power of at least a portion of the transmitted signal. This power increase can be accomplished, for example, with a normal fast power control feedback function used in conventional CDMA systems. Also, a different than normal procedure for handling voice/data inactivity can be used, since it is desirable for the MS to be able to transmit even during a period of voice/data inactivity.

At step 208, responsive to the order given in step 204, the MS 108 starts using the short codes. At step 210, at least one nearby non-active BS (e.g., BS2 and/or BS3 for this embodiment) is ordered by a base station controller (not explicitly shown) to start searching for the short code being used by the MS 108. This search is performed preferably with a filter matched to the SC+SSC (or only SC), such as the matched filter shown in FIG. 3. Alternatively, the BS search can be carried out by other equivalent search methods. Steps 212–218 will be described further on.

Figure 3:
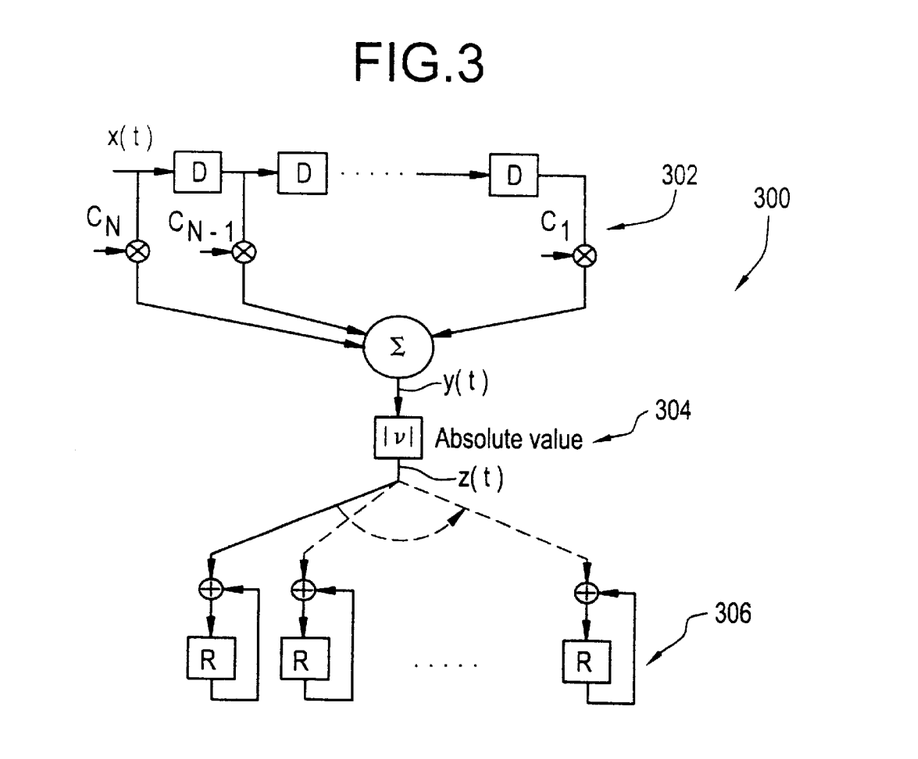
FIG. 3 is a schematic diagram of an exemplary filter that can be used in a base station of the system shown in FIGS. 1A and 1B which is receiving uplink signals whose TOA is to be determined, in accordance with the present invention.

FIG. 3 is a schematic diagram of an exemplary matched filter and corresponding non-coherent combining that can be used in a BS (e.g., BS1, BS2 and/or BS3) of the system shown in FIGS. 1A and 1B which is receiving uplink signals whose TOA is to be determined, in accordance with the present invention. Referring to the matched filter 302 in FIG. 3, the baseband signal, x(t), received from the MS 108, is coupled to an input of the matched filter as shown. Each "D" element denotes a chip delay, and "C" represents the short code that was used. The output from the matched filter portion, y(t), is passed through an absolute value function 304, and the resulting absolute value, z(t), is added to a register "R" 306. One register (R) at a time is increased. After "N" steps have been completed, all of the registers "R" (306) have been increased.

For this embodiment, the length of the SSC used is defined to be "N" chips, and for simplicity sake, the received signal is assumed to be sampled at the chip rate. In the event a faster sampling rate were to be used, it can be easily accommodated by, for example, using a plurality of parallel matched filters 302. If there were no interfering MS users, the output from the matched filter 302 will include one or several magnitude peaks every "N" chips. These peaks correspond to the different propagation paths that constitute the communication channel. The first of these peaks encountered is most likely to be for the direct-most path between the MS and BS, and the arrival time of this path is preferably used as a time stamp for the received signal. A plurality of these time stamps (each obtained from a different BS) can be used to estimate the position of the MS 108. As mentioned earlier, if the cell size is relatively large, a special approach can be used to resolve the inherent ambiguity. By using power measurements at the BSs, a relatively crude distance (to the MS) estimate can be obtained from expressions of path loss as a function of distance. This power measurement approach readily resolves the ambiguity problem. Furthermore, these power measurements are made during a relatively long interval. Consequently, the effects of fast fading are averaged out. Additionally, slow fading from one MS to several BSs can be strongly correlated. As such, when these potential ambiguities are resolved as described herein, a conventional location estimation algorithm can be used to calculate the position of the MS from the power measurements made.

FIG. 4 is a diagram that illustrates waveforms occurring at different stages in FIGS. 3, 1A and 1B and the filter shown in FIG. 2, and which can be used for determining the TOA of the uplink signals. In FIG. 4A, two information bits to be transmitted by she MS are shown, with one bit modulated as "1" and the other bit modulated as "−1". In FIG. 4B, the two bits in FIG. 4A are spread by a 16 chips long spreading code. FIG. 4C shows the spread signal from FIG. 4B when it is passed through the matched filter 302. The peaks shown correspond to the delay of the signal. FIG. 4D shows the absolute value, z(t), of the signal shown in FIG. 4C. FIG. 4E again shows the absolute value of the signal shown in FIG. 4C, but with noise added to the original signal. As illustrated, t is not as easy to discern the peaks in FIG. 4E as it is in FIG. 4D. In FIG. 4F, the same signal with noise is shown, but after it has been non-coherently combined during 20-bit intervals (in this embodiment, also the symbol interval).

Figure 4A:
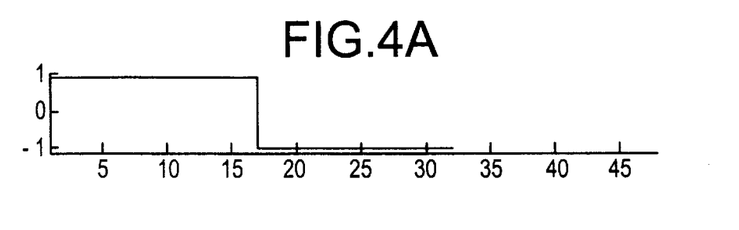
FIG. 4 is a diagram that illustrates waveforms occurring at different stages in FIGS. 3, 1A and 1B and the filter shown in FIG. 2, and which can be used for determining the TOA of the uplink signals.
Figure 4B:
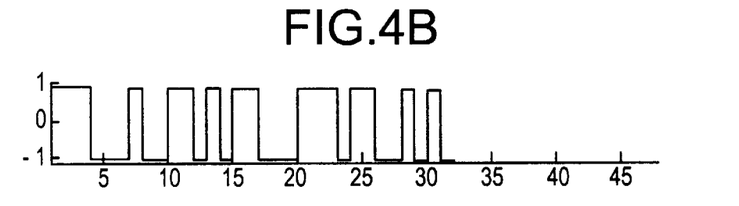
Figure 4C:
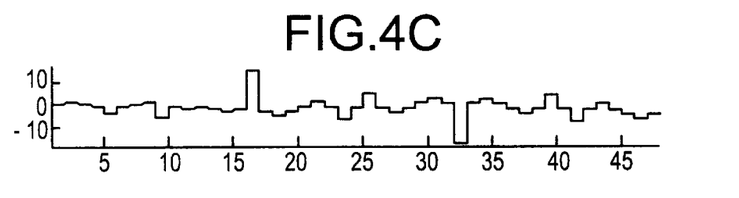
Figure 4D:
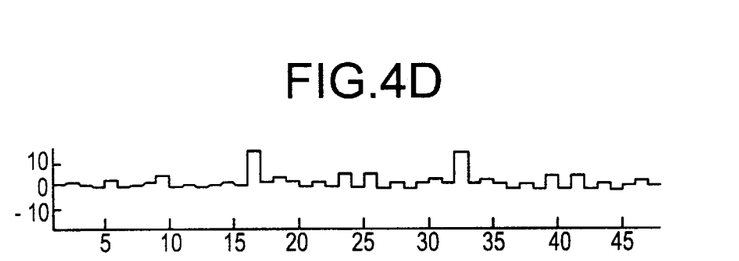
Figure 4E:
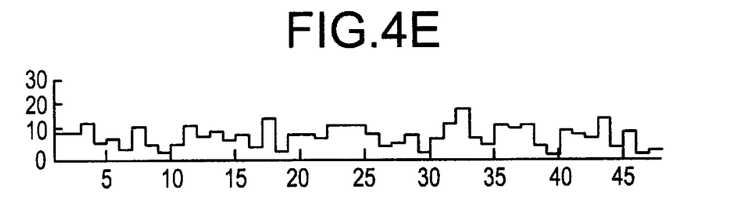
Figure 4F:
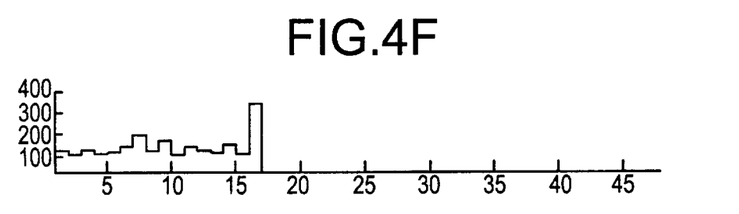

As shown in FIG. 4E, in the presence of interference, the aforementioned peaks (e.g., used for time stamps) are likely not discernible at the more remote BSs. This problem can be resolved by combining a relatively large number of N-chip sequences. At step 212 (FIG. 2), this combining is preferably performed non-coherently (e.g., as shown in FIG. 4F), since the transmitted data is unknown. The preferred approach used to perform this combining is to take the absolute value of the output of the matched filter, z(t), and then sum the so-obtained N-chip sequences together. In other words, an N entries long vector of data values is obtained, in which the $n^{th}$ entry is equal to $$|y(n)|+|y(n-N)|+|y(n-2N)| \qquad (2)$$

where "y" is the output of the matched filter 302. Alternatively, the squared modulus can be summed, and in this case, the $n^{th}$ entry would take the form $$|y(n)|^2+|y(n-N)|^2+|y(n-2N)|^2 \qquad (3)$$

Note that the above-described approach is an exemplary approach for performing non-coherent combining, and the present invention is not intended to be limited to any specific way of performing non-coherent combining.

In FIG. 4, the left-most peak of the above-described vector, which is above a certain threshold, indicates the arrival time of the direct-path signal. However, at step 214, the estimate of the actual TOA value for this path can be refined by using conventional signal processing techniques. For example, the location of the peak value can be determined by various signal interpolation and/or smoothing techniques. At step 216, the BS2 estimates the position of the MS 108 from the TOA information. At step 218, the MS 108 is ordered to resume normal operation.

The above-described non-coherent combining approach can be performed over a very long time period, without creating any detrimental effects on the communications system as such. One limitation on this approach is the time-stability of the MS. However, since the MS is accurately synchronized with the serving BS, this limitation is not a major problem.

Even if the non-coherent combining can be performed over a very long time period, it is still likely attractive for many applications to obtain a position estimate quite rapidly. In order to speed up the position determination process, and in some cases to make it possible at all, the MS can be ordered to increase its transmitter power. Usually when this situation occurs, the MS i s quite close to the serving BS (i.e., a "near-far" problem). This problem can result in the MS causing increased interference mainly in the serving cell. However, the part of the received signal stemming from this MS's nearness is strong and, consequently, easy to estimate. This type of situation is ideal for interference cancellation (IC). In other words, the signal part from the positioned MS can be estimated and subtracted from the received signal. As a result, the effect of the power increment will be much smaller than otherwise. This technique is best suited for systems that use coherent detection on the uplink. However, it is possible to use this technique in other systems as well (e.g., by using decision feedback). It should be noted that the typical power increase that is needed in conjunction with the present invention is far lower than in those methods where a special positioning signal is transmitted from the MS. With these types of methods, the positioning signal has to be transmitted at a very high power (up to 25 dB above normal) in order to minimize the data loss, which potentially causes severe interference and RF blocking in the serving cell.

Figure 5:
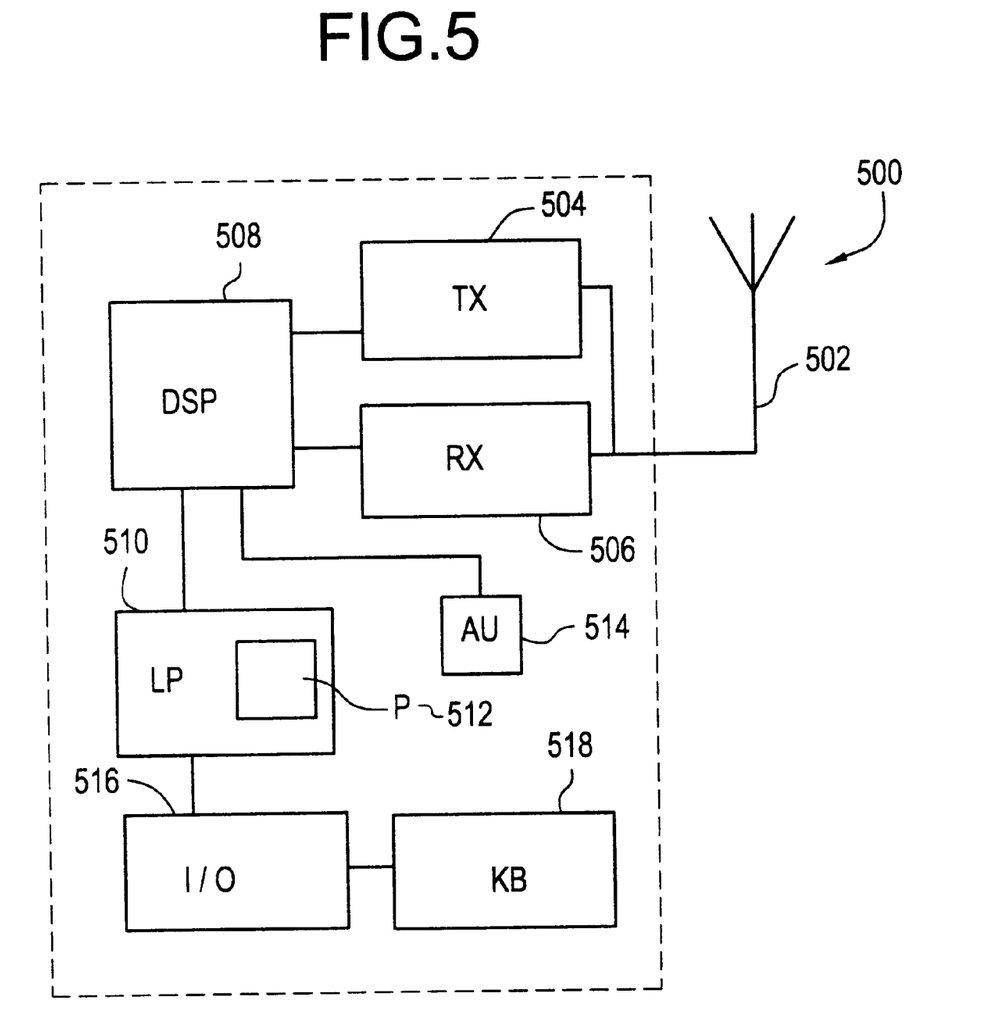
FIG. 5 is a schematic diagram that illustrates an exemplary mobile terminal, which can be used to implement a preferred embodiment of the present invention.

FIG. 5 is a schematic diagram that illustrates an exemplary mobile terminal, which can be used to implement a preferred embodiment of the present invention. For example, the mobile terminal 500 shown in FIG. 5 can be utilized as MS 108 in FIGS. 1A and 1B, whose position is being determined. For this embodiment, mobile terminal (MS) 500 includes a transmit/receive antenna 502, which is connected to a transmitter section (TX) 504, and a receiver section (RX) 506. The TX 504 and RX 506 are connected to a digital signal processor (DSP) 508, which functions primarily to process speech signals. A logical processor (LP) 510 is connected to the DSP 508. A program (P) 512 is executed in LP 510, which is for receiving and responding to an order to switch to a short spreading code and vice versa. An audio unit (AU) 514 is connected to the DSP 508, for inputting and outputting speech signals to and from the MS 500. User access and control of the MS logic is implemented by a keyboard (or keypad) KB 518 via an input/output (I/O) adapter 516. As such, if so desired, a user/subscriber of the MS 500 (108) can input via the keypad 518 instructions to the LP 510 to disregard an order to switch to a short spreading code or vice versa. In other words, the user/subscriber of the MS 500 (108) can effectively prohibit that MS's participation in a position determination procedure. In that case, the MS can send a message to the network via the air interface that (politely) denies the position determination order.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for aiding in a determination of the position of a mobile terminal in a CDMA mobile radio system, comprising the steps of:

for measuring an uplink time of arrival, ordering said mobile terminal to switch from spreading with a first short spreading code and a long spreading code to spreading with at least a second short spreading code;

receiving in at least three radio base stations a transmitted signal from said mobile terminal including said at least a second short spreading code;

measuring said uplink time of arrival for said transmitted signal in said at least three radio base stations, using a correlation with said at least a second short spreading code independently of information conveyed in said transmitted signal; and wherein said at least a second short spreading code is different from said first short spreading code.

2. The method of claim 1, wherein said step of ordering further comprises the step of ordering said mobile terminal to increase power of at least a part of said transmitted signal to a predetermined level.

3. The method of claim 1, wherein at least one of said first short spreading code, said long spreading code, and said at least a second short spreading code serves to scramble transmissions from said mobile terminal.

4. The method of claim 1, wherein said transmitted signal comprises at least 160 symbols.

5. A method for aiding in a determination of the position of a mobile terminal in a CDMA mobile radio system, comprising the steps of:

for measuring an uplink time of arrival, ordering said mobile terminal to switch from spreading with a first short spreading code and a long spreading code to spreading with at least a second short spreading code;

receiving in at least three radio base stations a transmitted signal from said mobile terminal including said at least a second short spreading code;

measuring said uplink time of arrival for said transmitted signal in said at least three radio base stations, using a correlation with said at least a second short spreading code independently of information conveyed in said transmitted signal; and wherein said step of ordering is completed only if a subscriber of said mobile terminal provides permission.

6. A method for aiding in a determination of the position of a mobile terminal in a CDMA mobile radio system, comprising the steps of:

for measuring an uplink time of arrival, ordering said mobile terminal to switch from spreading with a first short spreading code and a long spreading code to spreading with at least a second short spreading code;

receiving in at least three radio base stations a transmitted signal from said mobile terminal including said at least a second short spreading code;

measuring said uplink time of arrival for said transmitted signal in said at least three radio base stations, using a correlation with said at least a second short spreading code independently of information conveyed in said transmitted signal; and wherein said step of measuring further comprises the steps of:

filtering said transmitted signal, which is received in said step of receiving, in a filter matched to said at least a second short spreading code to produce a filtered signal;

forming an absolute value of said filtered signal;

incoherently summing said absolute value to form a summed signal;

determining a peak value of said summed signal; and determining said uplink time of arrival from a time of said peak value relative to a reference.

7. The method of claim 6, wherein said step of filtering further comprises the step of forming a squared signal from an absolute value of an output of said matched filter.

8. The method of claim 6, wherein said at least a second short spreading code is optimized with respect to correlation properties for position determination.

9. The method of claim 8, wherein said at least a second short spreading code is one symbol in length, and the auto-correlation properties and cross-correlation to other signals are optimized for position determination.

10. The method of claim 5, wherein at least one of said first short spreading code, said long spreading code, and said at least a second short spreading code serves to scramble transmissions from said mobile terminal.

11. The method of claim 6, wherein at least one of said first short spreading code, said long spreading code, and said at least a second short spreading code serves to scramble transmissions from said mobile terminal.

12. A method for determining a position of a mobile station in a Code Division Multiple Access (CDMA) mobile radio system, comprising the steps of:

ordering said mobile station to switch from spreading with a first short spreading code and a long spreading code to spreading with said first short spreading code and a second short spreading code and to cease spreading with said long spreading code;

receiving in at least one base station a transmitted signal from said mobile station, said transmitted signal including said second short spreading code;

measuring a time of arrival for said transmitted signal in said at least one base station using a correlation with said second short spreading code and said first short spreading code; and determining at least an approximate position of said mobile station using said time of arrival that is measured in said at least one base station in said step of measuring.

13. The method of claim 12, wherein at least one of said first short spreading code, said long spreading code, and said second short spreading code serves to scramble transmissions from said mobile terminal.

14. A method for determining a position of a mobile station in a Code Division Multiple Access (CDMA) mobile radio system, comprising the steps of:

ordering said mobile station to switch from spreading with a first code option to spreading with a second code option;

receiving in at least one base station a transmitted signal from said mobile station, said transmitted signal being transmitted with said second code option;

measuring a time of arrival for said transmitted signal in said at least one base station using at least a portion of said second code option; and determining at least an approximate position of said mobile station using said time of arrival that is measured in said at least one base station in said step of measuring without prior knowledge of information conveyed in said transmitted signal.

15. The method of claim 14, wherein said step of measuring a time of arrival for said transmitted signal in said at least one base station using said second code option comprises the step of measuring said time of arrival for said transmitted signal in said at least one base station using, at least partly, a correlation with said at least a portion of said second code option.

16. The method of claim 14, wherein said first code option comprises a first short spreading code and a long spreading code and said second code option comprises said first short spreading code and not said long spreading code.

17. The method of claim 14, wherein said first code option comprises a first short spreading code and a long spreading code and said second code option comprises said first short spreading code and a second short spreading code.

18. The method of claim 17, wherein said second short spreading code serves to scramble said transmitted signal.

19. The method of claim 17, wherein said second short spreading code is of a time-length of approximately one symbol period.

20. The method of claim 14, wherein said first code option comprises a first short spreading code and a long spreading code and said second code option comprises a second short spreading code and not said first short spreading code nor said long spreading code, said first short spreading code being different from said second short spreading code.

21. The method of claim 16, 17, or 20, wherein said long spreading code serves to scramble transmissions from said mobile station when said long spreading code is in use.

22. A method for determining a position of a mobile station in a Code Division Multiple Access (CDMA) mobile radio system, comprising the steps of:

transmitting, from said mobile station, using a short spreading code and a long scrambling code;

sending, from a network infrastructure to said mobile station, an order to begin a position-determination procedure by switching from said long scrambling code to a short scrambling code;

transmitting, from said mobile station, a position-determination signal using said short spreading code and said short scrambling code;

receiving, by at least one base station, said position-determination signal;

measuring a time of arrival for said position-determination signal based, at least in part, on a correlation with said short scrambling code and said short spreading code; and determining at least an approximate position of said mobile station based, at least in part, on said time of arrival.

23. The method of claim 22, wherein said order is an optional order and said step of transmitting, from said mobile station, a position-determination signal using said short spreading code and said short scrambling code is performed only if at least one of a user and a subscriber of said mobile station so elects.

* * * * *

UNITED STATES PATENT AND TRADEMARK OFFICE
CERTIFICATE OF CORRECTION

PATENT NO. : 6,134,228
DATED : October 17, 2000
INVENTOR(S) : Cedervall et al.

It is certified that error appears in the above-identified patent and that said Letters Patent is hereby corrected as shown below:

<u>Item [57] Abstract,</u>
Line 7, replace "spreading codes used" with -- spreading code used --

<u>Column 1,</u>
Line 24, replace "RS" with -- BS --

<u>Column 3,</u>
Line 46, replace "on" with -- In --

<u>Column 6,</u>
Line 62, replace "12" with -- 1B --

<u>Column 8,</u>
Line 2, replace "she" with -- the --
Line 11, replace ", t" with -- , it --
Line 29, replace " $|y(n)| +|y(n-N)| +|y(n-2N)|(2)$ " with
-- $|y(n)| +|y(n-N)| +|y(n-2N)|..., (2)$ --

Line 34, replace "" $|y(n)|^2 +|y(n-N)|^2 +|y(n-2N)|^2 (3)$ "
with -- " $|y(n)|^2 +|y(n-N)|^2 +|y(n-2N)|^2 ... (3)$ Line 63, replace "I s" with -- is --

Signed and Sealed this

Twenty-fifth Day of September, 2001

Attest:

NICHOLAS P. GODICI
Attesting Officer    Acting Director of the United States Patent and Trademark Office